United States Patent
Souza et al.

(10) Patent No.: US 9,635,107 B2
(45) Date of Patent: Apr. 25, 2017

(54) SYSTEM AND METHOD FOR MANAGING DATA DELIVERY IN A PEER-TO-PEER NETWORK

(75) Inventors: Victor Souza, Solna (SE); Tereza Cristina Melo de Brito Carvalho, Sao Paulo (BR); Charles Christian Miers, Sao Paulo (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 474 days.

(21) Appl. No.: 13/698,977

(22) PCT Filed: May 20, 2010

(86) PCT No.: PCT/EP2010/056996
§ 371 (c)(1),
(2), (4) Date: Nov. 19, 2012

(87) PCT Pub. No.: WO2011/144245
PCT Pub. Date: Nov. 24, 2011

(65) Prior Publication Data
US 2013/0073727 A1 Mar. 21, 2013

(51) Int. Cl.
*H04L 29/12* (2006.01)
*H04L 12/24* (2006.01)
(Continued)

(52) U.S. Cl.
CPC .......... *H04L 67/1063* (2013.01); *H04L 45/44* (2013.01); *H04L 67/1059* (2013.01); *H04L 67/1093* (2013.01); *H04L 67/18* (2013.01)

(58) Field of Classification Search
CPC .... H04L 45/34; H04L 45/44; H04L 29/08441
(Continued)

(56) References Cited

U.S. PATENT DOCUMENTS

2004/0254977 A1* 12/2004 Zhang ........................... 709/201
2005/0198109 A1* 9/2005 Teodosiu ............... H04L 29/06
709/201
(Continued)

FOREIGN PATENT DOCUMENTS

CN 101207531 A 6/2008
CN 101257396 A 9/2008
(Continued)

OTHER PUBLICATIONS

Kostas Pentikousis, Teemu Rautio; A Multiaccess Network of Information; Aug. 3, 2010; IEEE Xplore.*
(Continued)

*Primary Examiner* — Kevin Bates
*Assistant Examiner* — Mark A Scott
(74) *Attorney, Agent, or Firm* — Rothwell, Figg, Ernst & Manbeck, P.C.

(57) ABSTRACT

A system and method for managing content data transfers in a peer-to-peer communications network is described. The system includes a hierarchical arrangement of tracker modules, each tracker module being responsible for managing a tracker domain of network elements. Each tracker module has stored therein a content table including a record of content data available to the network elements within its respective tracker domain. Each tracker module responsible for a tracker domain containing end user peers is configured so that, if a content data request is received from a requesting peer in its respective tracker domain and the requested content is held by other peers in that tracker domain, a list of peers having the content data stored thereon is sent to the requesting peer. If the requested content is not held by enough other peers in that tracker domain, the content data request is transferred to the next tracker module up in the hierarchy.

33 Claims, 4 Drawing Sheets

(51) Int. Cl.
  *G06F 17/30* (2006.01)
  *G06F 15/16* (2006.01)
  *H04L 29/08* (2006.01)
  *H04L 12/721* (2013.01)

(58) Field of Classification Search
  USPC ........................................................ 709/224
  See application file for complete search history.

(56) References Cited

U.S. PATENT DOCUMENTS

| | | | | |
|---|---|---|---|---|
| 2007/0028133 A1* | 2/2007 | Izutsu | .................. | H04L 67/104 714/4.11 |
| 2007/0244894 A1* | 10/2007 | St. Jacques | ....................... | 707/9 |
| 2007/0288593 A1* | 12/2007 | Wang | .................. | G06Q 20/123 709/217 |
| 2008/0022012 A1* | 1/2008 | Wang | ...................... | H04L 47/10 709/238 |
| 2008/0037438 A1* | 2/2008 | Twiss et al. | .................. | 370/252 |
| 2008/0040482 A1* | 2/2008 | Twiss et al. | .................. | 709/226 |
| 2008/0133706 A1* | 6/2008 | Chavez et al. | ................. | 709/218 |
| 2008/0208996 A1* | 8/2008 | Thompson | .................... | 709/206 |
| 2008/0285577 A1* | 11/2008 | Zisapel | ............... | H04L 12/2856 370/409 |
| 2008/0320300 A1* | 12/2008 | Gkantsidis | .............. | G06F 21/10 713/158 |
| 2009/0083390 A1 | 3/2009 | Abu-Ghazaleh et al. | | |
| 2009/0100128 A1* | 4/2009 | Czechowski, III | ... | H04L 67/104 709/203 |
| 2009/0182815 A1* | 7/2009 | Czechowski, III | ... | H04L 67/104 709/206 |
| 2009/0234918 A1 | 9/2009 | Neumann et al. | | |
| 2009/0240758 A1* | 9/2009 | Pasko | .................. | H04L 67/104 709/201 |
| 2009/0276522 A1* | 11/2009 | Seidel | ..................... | H04L 43/12 709/224 |
| 2009/0319502 A1* | 12/2009 | Chalouhi et al. | ................. | 707/4 |
| 2010/0185753 A1* | 7/2010 | Liu | ..................... | H04L 65/4084 709/219 |
| 2010/0235432 A1* | 9/2010 | Trojer | ................ | H04L 12/2861 709/203 |
| 2010/0293294 A1* | 11/2010 | Hilt | ...................... | H04L 67/104 709/241 |
| 2011/0010387 A1* | 1/2011 | Chalouhi | .......... | G06F 17/30094 707/769 |
| 2011/0058549 A1* | 3/2011 | Harel | .................. | H04L 47/2483 370/390 |
| 2011/0060721 A1* | 3/2011 | Chalouhi | .............. | H04L 67/104 707/622 |
| 2011/0078312 A1* | 3/2011 | Rimac | ................. | H04L 67/104 709/227 |
| 2011/0087915 A1* | 4/2011 | Zhang | ................ | H04L 12/1854 714/2 |
| 2011/0099372 A1* | 4/2011 | Annapureddy | ...... | H04N 21/632 713/168 |
| 2011/0138437 A1* | 6/2011 | Mahadevappa | .... | H04N 21/2187 725/135 |
| 2011/0225311 A1* | 9/2011 | Liu | ....................... | H04L 45/125 709/231 |
| 2011/0225312 A1* | 9/2011 | Liu | .......................... | H04L 12/18 709/231 |
| 2011/0238756 A1* | 9/2011 | Damola et al. | ............... | 709/204 |
| 2011/0246608 A1* | 10/2011 | Wu | ..................... | H04L 65/4084 709/217 |
| 2011/0252151 A1* | 10/2011 | Lu | ....................... | H04W 80/045 709/228 |
| 2011/0258016 A1* | 10/2011 | Barak et al. | .................. | 705/7.29 |
| 2011/0282945 A1* | 11/2011 | Thyni | ................ | H04L 41/0893 709/204 |
| 2011/0295981 A1* | 12/2011 | Damola et al. | ............... | 709/219 |
| 2011/0296053 A1* | 12/2011 | Medved et al. | .............. | 709/241 |
| 2012/0215850 A1* | 8/2012 | Kiesel | ................... | H04L 67/104 709/204 |
| 2012/0272282 A1* | 10/2012 | Yang | ..................... | H04L 67/104 725/116 |
| 2012/0303715 A1* | 11/2012 | Han et al. | ..................... | 709/205 |
| 2013/0054797 A1* | 2/2013 | Khasnabish | .................. | 709/224 |

FOREIGN PATENT DOCUMENTS

| | | | |
|---|---|---|---|
| CN | 101262487 A | | 9/2008 |
| CN | 101534252 A | | 9/2009 |
| EP | 1 630 684 A1 | | 3/2006 |
| EP | 2086206 A1 | * | 8/2009 |
| EP | 2 106 086 A1 | | 9/2009 |
| FR | EP 2086206 A1 | * | 8/2009 ............ H04L 47/20 |
| WO | 2010101496 A9 | | 9/2010 |

OTHER PUBLICATIONS

Charles Miers, Marcos Simplicio, Walter Goya, Tereza Carvalho, Victor Souza; An architecture for P2P locality in managed networks using hierarchical trackers; Jan. 17, 2011; IEEE Xplore.*

Wang et al. "Traffic Shaping in BitTorrent Systems by Centralized Hierarchical Peer-Node Assignment" IEEE International Conference on Communication, 2008: ICC '08; May 19-23, 2008, Beijing, China, XP031265664, pp. 1787-1791.

Office Action dated Dec. 3, 2014, issued in Chinese Patent Application No. 201080066873.2, 7 pages.

Xiao et al. "Distributed Proximity-Aware Peer Clustering in Bit Torrent-Like Peer-to-Peer Networks" 2006, pp. 375-384.

Xie et al. "P4P: Explicit Communications for Cooperative Control Between P2P and Network Providers" 2007, 7 pages.

Alimi et al. "P4P: Provider Portal for P2P Applications draft-p4p-framework-00.txt" Network Working Group, 2008, 28 pages.

Alimi et al. "ALTO Protocol draft-ietf-alto-protocol-03.tx" ALTO WG, 2010, 52 pages.

* cited by examiner

… (1)

SYSTEM AND METHOD FOR MANAGING DATA DELIVERY IN A PEER-TO-PEER NETWORK

CROSS REFERENCE TO RELATED APPLICATION(S)

This application is a 35 U.S.C. §371 National Phase Entry Application from PCT/EP2010/056996, filed May 20, 2010, designating the United States, the disclosure of which is incorporated herein in its entirety by reference.

TECHNICAL FIELD

The present invention relates to managing data delivery in a peer-to-peer (P2P) communications network. In particular, the invention relates to the management of trackers in a P2P network.

BACKGROUND

In P2P computer networks, peer nodes (or peers) cooperate to deliver data content to one another. The diverse connectivity and the cumulative bandwidth of the peers is used for sharing data content such as, for example, files containing audio, video, data or anything in digital format, telephony traffic, video streaming or video download. A P2P network can, in many cases, provide a much more efficient distribution of data content than a hierarchical network topology with a relatively low number of centralised servers providing data content to end nodes. In a pure P2P network there is no notion of clients or servers, but only of equal peers. There are, however, many types of hybrid P2P networks which combine a client-server structure with the P2P structure, since different network structures may be preferred for different types of tasks. Hereinafter the term "P2P network" is intended to encompass both pure P2P networks and hybrid P2P networks.

There is a number of different protocols that may be used for P2P communication. Examples include BitTorrent, Gnutella, CAN, FastTrack, and JXTA. The BitTorrent protocol is one of the most widely used P2P protocols and is described in "The BitTorrent Protocol Specification", version 11031, by Cohen, Bram, last edited 28 Feb. 2008, available at http://www.bittorrent.org/beps/bep_0003.html.

In a P2P system a tracker is a software server application that centrally coordinates the P2P communication among users. Tracker software manages torrent swarms to be used by peers—a torrent swarm essentially contains information about clients interested in a content. Specifically, the tracker identifies the IP address of each client either uploading or downloading the content associated with a torrent.

BitTorrent clients connect to a tracker specified in the torrent file in order to join a swarm. The tracker sends to the client (peer) a list of peers that are part of the swarm, and from that point on most of the interaction happens between clients. Clients will send messages of interest, exchange bit maps, and finally requests for given content chunks. However, it must be noted that the list of peers initially obtained from the tracker is of major importance—those are the peers that will be used for downloading content. Thus the tracker performs a central role in the BitTorrent model.

The original BitTorrent architecture uses one or a set of trackers in which BitTorrent clients (peers) connect in order to request a list of potential sources in a swarm. When a BitTorrent client joins a swarm, the tracker responds with a list of randomly selected peers. By default, the number of peers in the list is 50 peers. A BitTorrent client can utilize several trackers that have the same content by joining each swarm managed by them. If there are multiple trackers for the same content, each tracker manages one swarm of that content. Subsequently, the BitTorrent client applies standard BitTorrent policies (optimist unchoking, rarest first, buffer emptiness prioritization) to choose the peers, obtain the content and share the acquired content parts. Even though a list of 50 peers is received from the tracker, the default simultaneous number of peers used to acquire the content is four.

A well-known problem related to the BitTorrent architecture is the lack of locality awareness. That is, a client who joins a swarm will receive a list of peers that is randomly selected by the tracker. A client may download content from peers that are very distant network wise, even though many peers nearby (network wise) have the same content. Some solutions to this problem utilize databases of IP geo location to create locality awareness. These solutions are not very accurate since these databases contain errors and, most importantly, geographical distance does not imply network distance.

Furthermore, the tracker does not take into account the usage of the network resources when selecting the peers on behalf of a client. Since the client chooses other peers out of the list obtained from the tracker based on the standard BitTorrent policies (which are intended to incentive the content sharing and keep the content available on the swarm), network resources are often sub-optimally utilized.

The tracker model for delivery of P2P content is far from ideal for utilization in a managed operator network, since the operator does have a lot of information about network topology and current network load on links. When an operator utilizes P2P techniques for delivery of VoD or time shift content (as described, for example, in WO 2009/152865) it must ensure a given download rate and consequently playback continuity. This cannot be achieved using existing tracker techniques.

Work being standardized in IETF (described in ALTO WG, Application Layer Traffic Optimization Working Group, http://tools.ietf.org/wg/alto/ and "P4P: Explicit Communications for Cooperative Control Between P2P and Network Providers", Haiyong Xie, Arvind Krishnamurthy, Avi Silberschatz, Y. Richard Yang) tries to solve the locality question by utilizing a tracker that has more knowledge about the network and the peers. One possible approach is to create an enhanced tracker that receives three different inputs to compile a peer list: current network load, network topology and peer content availability. A list of peers can be calculated based on operator policies together with these three inputs.

However, such a tracker will very quickly suffer scalability problems. The number of content assets to be managed, the number of clients participating in a swarm and the size of the network will put very high strain on such a tracker.

In addition, to keep the protocol simple the BitTorrent tracker does not know which peers contain specific parts of the content (blocks) in the swarm. It is therefore possible that the peer list returned to a client contains peers that do not have the desired parts of the content. The effort wasted by communicating with unusable peers could affect the quality of the service.

SUMMARY

It is the object of the present invention to obviate at least some of the above disadvantages. It would be desirable to provide a system for a P2P network to improve the utilisation and/or control of network resources.

In accordance with one aspect of the present invention there is provided a tracker module for use in a peer-to-peer communications network. The tracker module is configured to manage content data transfers between a discrete set of network elements forming a tracker domain within the network, and comprises a storage medium having a content table stored therein, the content table including a record of content data available to each network element within the tracker domain. The tracker module also comprises a communications interface for receiving a content data request from a requesting network element in the tracker domain, and a processing unit for interrogating the content table stored in the storage medium and determining whether the requested content data is available to any of the network elements within the tracker domain. The tracker module is configured so that, if the requested content data is available to any of the network elements within the tracker domain, the processing unit determines a list of network elements through which the content data is available, and the communications interface sends said list to the requesting network element. The tracker module is further configured so that, if the requested content data is not available to any of the network elements within the tracker domain, the communications interface sends a supplementary request for the content data to another tracker module in the network, the other tracker module being higher up in a tracker hierarchy in the network.

This provides for a distributed hierarchical set of trackers where each tracker is responsible for a portion of the network.

The content data may be subdivided into blocks, and the content table may include a record of which blocks are available to each network element in the tracker domain.

The requesting network element may be an end user peer in the tracker domain, and the content table may include a record of the content blocks stored by other peers in the tracker domain.

The requesting network element may be another tracker module in the tracker domain which is lower in the tracker hierarchy, and the content table may include a record of content data available to other tracker modules in the tracker domain. If this is the case, the record of content data available to each other tracker module in the tracker domain does not need to include a record of the individual peer on which the content data is stored. This enables the aggregation, or condensation, of information up the hierarchy.

The communications interface may be configured to receive content data updates from network elements within the tracker domain, the content data updates informing the tracker module of changes to the content data available to the respective network elements. The processing unit may then be configured to update the content table to reflect the content data updates. This ensures that the record of the data held by peers, or available within the domains of hierarchically lower tracker modules, is up to date.

The tracker module may further be configured so that, if a supplementary request for the content data is sent to the other tracker module higher up in the tracker hierarchy, the communications interface is configured to receive a content data location response from the other tracker module. The content data location response may provide a list of tracker modules in the network through which the requested content data is available. The communications interface may be configured to contact the other tracker modules in the network to obtain a list of peers in the network from which the requested content data can be obtained. This list of peers may identify the peers at which specific blocks of the content data can be obtained. Thus if the requested content data is not available in the domain of the original tracker module, the hierarchical system of tracker modules can be used to find a domain (and, ultimately, the peers themselves), in which it is present. The tracker module may be configured to hold the list of peers in the storage medium for a finite period of time so that it is available to other network elements in the tracker domain within that finite period. If no peer requests the content within the period, the list may expire so that it is no longer maintained in the tracker module.

The storage medium may have stored therein a record of the network topology of the tracker domain, and the communications interface may be configured to receive a notification of current network conditions within the tracker domain. The processing unit may then be configured to take the network topology and/or network conditions into account when determining the list of network elements through which the content data is available so as to optimise use of network resources.

In accordance with another aspect of the present invention there is provided a system for managing content data transfers in a peer-to-peer communications network. The system comprises a hierarchical arrangement of tracker modules, each tracker module being responsible for managing a tracker domain of network elements. Each tracker module has stored therein a content table including a record of content data available to the network elements within its respective tracker domain. Each tracker module responsible for a tracker domain containing end user peers is configured so that, if a content data request is received from a requesting peer in its respective tracker domain, and if the requested content is held by enough other peers in that tracker domain to supply the content data, a list of peers having the content data stored thereon is sent to the requesting peer. If the requested content is not held by enough other peers in that tracker domain, the content data request is transferred to the next tracker module up in the hierarchy. The content data request may be passed up the tracker module hierarchy until a tracker module is reached in which the content table includes a record of the requested content data.

The content data may be separated into blocks. The content table of each tracker module having end user peers in its respective tracker domain may identify the blocks stored by each end user peer in that tracker domain, and the content table of each tracker module having hierarchically lower tracker modules in its respective tracker domain may identify the blocks stored within the tracker domain of each hierarchically lower tracker module. This provides a mechanism for aggregation of information so that tracker modules high up the hierarchy do not need to have information about the peers on which each block is stored, merely the hierarchically lower domains in which they can be found.

Each tracker module may include a record of network topology and current network conditions in its respective tracker domain, and the list of peers may be calculated on the basis of the network topology and current network conditions so as to optimise network resources. The record of network topology may include a weighted graph with transmission costs for each link.

The list of peers may contain the minimum number of peers possible to provide the content data.

In accordance with another aspect of the present invention there is provided a network element configured to operate as a peer in a tracker domain managed by a tracker module in a peer-to-peer communications network. The network element comprises a storage medium for storing content data in the form of content blocks. The network element also comprises a communications interface for receiving content blocks from other peers in the network, forwarding content blocks to other peers in the network, and notifying the tracker module of the content blocks stored in the storage medium and available for forwarding to other peers. A control unit is provided for controlling the storage medium and communications interface. The communications interface may be configured to send a request for content data to the tracker module in the tracker domain.

In accordance with another aspect of the present invention there is provided a method of managing content data transfers in a peer-to-peer communications network partitioned into tracker domains, each managed by a respective tracker module, where the tracker modules are organised in a hierarchical structure. The method comprises maintaining a content table at each tracker module, the content table including a record of content data available to the network elements within its respective tracker domain. A content data request is sent from a peer in one of the tracker domains to the tracker module responsible for that domain. If the content table maintained by that tracker module indicates that the content data is held by enough other peers within the domain to supply the data, a list of peers holding the content data is sent from the tracker module to the requesting peer, and the content is downloaded to the requesting peer from the peers on the list. If the content table indicates that the content data is not held by enough other peers within the domain, the content data request is forwarded to tracker modules further up the hierarchy until one is reached whose content table indicates that the content data is available to one or more network elements within its tracker domain. Contact is then established between the tracker module at which the original request was received and the tracker module with access to the contact data. A list of peers having the content is forwarded to the requesting peer, and the content is downloaded to the requesting peer. It will be appreciated that this list of peers may include a combination of peers in the tracker domain of the requesting network element and peers external to this original tracker domain.

The information contained in the content tables of tracker modules is aggregated up the hierarchy, so that tracker modules which are contacted directly by peers have a record of content data blocks stored by those peers, and tracker modules which are contacted by hierarchically lower tracker modules have a record of content data blocks stored under those hierarchically lower tracker modules, without having a record of the peers at which those content data blocks are stored.

Each tracker module may have a record of network topology and network conditions within its tracker domain, and may configure the list of peers to send to the requesting peer taking these into account.

In accordance with another aspect of the present invention there is provided a method of managing data in a peer-to-peer communications network. A content data request from a requesting network element within the tracker domain is received at a tracker module responsible for managing content data transfers between a discrete set of network elements forming a tracker domain within the network. A content table stored at the tracker module and including a record of content data available to each network element within the tracker domain is interrogated. The tracker module determines whether the requested content data is available to enough network elements within the tracker domain to supply the content data. If the requested content data is available to enough network elements within the tracker domain, a list of network elements through which the content data is available is determined, and sent to the requesting network element. If the requested content data is not available to enough network elements within the tracker domain, a supplementary request for the content data is sent to another tracker module in the network, the other tracker module being higher up in a tracker hierarchy in the network.

The invention also provides a computer program, comprising computer readable code which, when run by a tracker module, causes the tracker module to operate any of the methods described above or to operate as a tracker module as described above. The invention also provides a computer program product comprising a computer readable medium and a computer program as just described, wherein the computer program is stored on the computer readable medium.

BRIEF DESCRIPTION OF THE DRAWINGS

Some preferred embodiments of the invention will now be described by way of example only and with reference to the accompanying drawings, in which.

DETAILED DESCRIPTION

The general approach described is the static partition of a network into "tracker domains", each having a tracker responsible for it. The size of a tracker domain can be dependent on the number of network nodes, number of managed content assets, amongst others. The trackers are arranged in a hierarchy. A peer will contact the tracker that is responsible for its respective domain when joining a swarm. If content is not available in this "local" tracker, the request is then forwarded to the next tracker in the hierarchy, until the content is found or deemed to be inexistent in the entire network. Moreover, the peers will notify their own local tracker which video/content chunks they have available. The hierarchy scheme provides a powerful and natural locality mechanism—nearby peers will always be preferred.

Each tracker is designed to return a peer list containing the minimum number of peers necessary to obtain the content according to locality criteria. This characteristic avoids obtaining content from network distant peers. Each tracker domain can be configured individually in order to use the locality criteria that best fits the domain necessities. Thus, the proposed solution is also flexible allowing a good degree of configurability for most different network scenarios and topologies.

Figure 1:
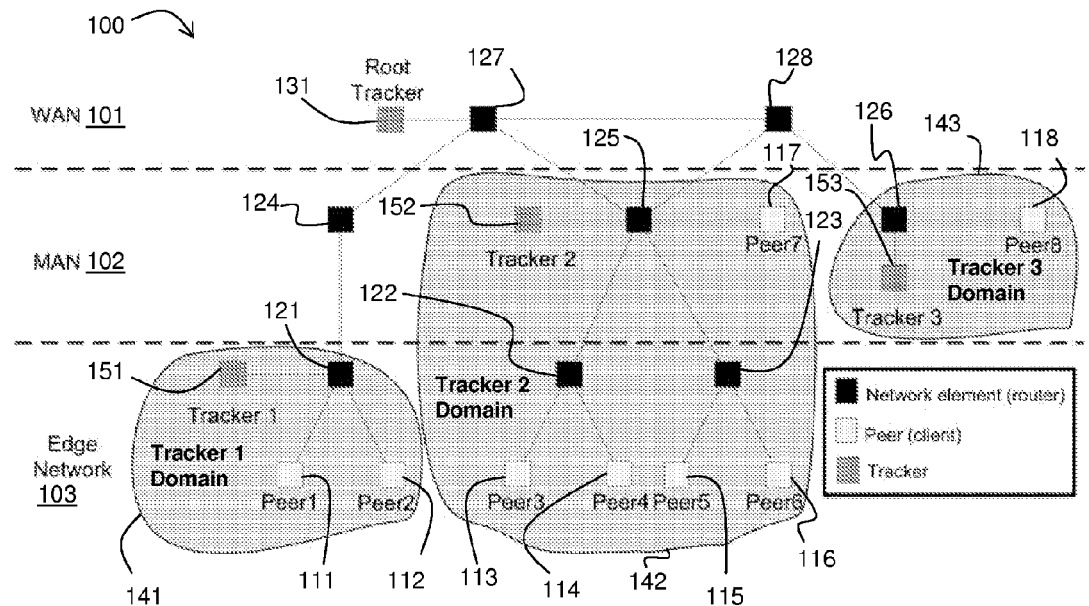
FIG. 1 is a schematic illustration of a portion of an exemplary P2P network.

FIG. 1 is a schematic illustration of a portion of an exemplary network 100 in which peers are capable of sharing data using P2P protocols such as BitTorrent. As illustrated in FIG. 1, the network includes nodes in a Wide Area Network (WAN) 101, Metropolitan Area Network (MAN) 102 and Edge Network 103. To simplify the Figure only a small number of peers are depicted. A real deployment will encompass many more peers. Six peer nodes (Peer1 to Peer6) 111-116 in the edge network are connected, via edge network routers 121-123 and MAN routers 124, 125, to WAN routers 127, 128. Two peer nodes (Peer7, Peer8) 117, 118 in the MAN are also connected to WAN routers 127, 128. The Peer7 117 and Peer8 118 nodes can be operator managed cache servers strategically positioned in the network to provide content chunks to end-users. Peer7 and Peer8 behave in the same way a peer herein defined does.

A root tracker 131 is responsible for managing data transmission between the peer nodes (Peer1 to Peer8) 111-116. The root tracker does not manage the task in isolation: the network is portioned into three domains (or "scopes") 141, 142, 143. A local tracker 151, 152, 153 is responsible for each of these domains 141, 142, 143. The trackers 131, 151, 152, 153 are organised in a hierarchy, and information is aggregated as one traverses the tree of trackers, as will be described in more detail below.

Each tracker 151, 152, 153 is responsible for a partition of the whole network 100. The distribution of partitions is determined by the network operator, mostly depending on the number of clients (peers) to be served in that domain of the network. It will be appreciated that "domain" in this context is not necessarily a geographical region: it represents a collection of nodes relatively close to each other in a network sense. For example, as shown in FIG. 1, one of the domains 142 extends from the MAN 102 into the edge network 103.

When a peer (e.g. Peer5 15) wishes to obtain data, it contacts the tracker 152 responsible for its domain 142, to obtain a list of peers of a swarm. Similarly, each peer (e.g. Peer5 15) notifies its local tracker 152 of the data content it has available (e.g. video chunks).

When a tracker 152 does not have information to respond to a given client request (for example, if the other peers 113, 114, 116, 117 in the domain 152 do not have the necessary data) it will contact the next tracker up in the hierarchy. If that tracker has the information it will reply immediately with a tracker list of other trackers 151, 153 which have the requested content available under their scope (in their domains). Otherwise it will send another request upwards in the hierarchy and that process will be repeated, until the request is answered or the root tracker 131 is reached.

Each tracker 151, 152, 153 is also enhanced with network topology and network load information. This allows the tracker to perform enforcement of advanced network traffic policies. The list of peers a tracker sends to a requesting peer will not be random, but instead the result of an informed calculation.

It will be appreciated that the arrangement shown in FIG. 1 is a simple example, in which the hierarchical tracker architecture is divided in two hierarchical levels, but that multiple levels of hierarchy may also be used. For the sake of clarity, the "two level" model is used as an example for the following discussion, but it should be understood that the same principles will apply however many levels are used, and that a hierarchical tree of trackers may be built up.

When there are two levels:
The lower level is formed by trackers 151-153, network elements (routers) 121-125 and peers 111-118. One tracker 151 and one or more peers 111, 112 are grouped taking into account a criterion such as their network or geographical area. This group of nodes defines a tracker domain or scope 141, and an operator can have many tracker domains. Each tracker 151 controls swarms composed by peers 111, 112 in its domain, and also knows the network topology that is covered by its domain. The peers 111, 112 report to their local tracker 151 what content (and which parts) they have available so that the tracker can know about all the content available in its domain.

Figure 2:
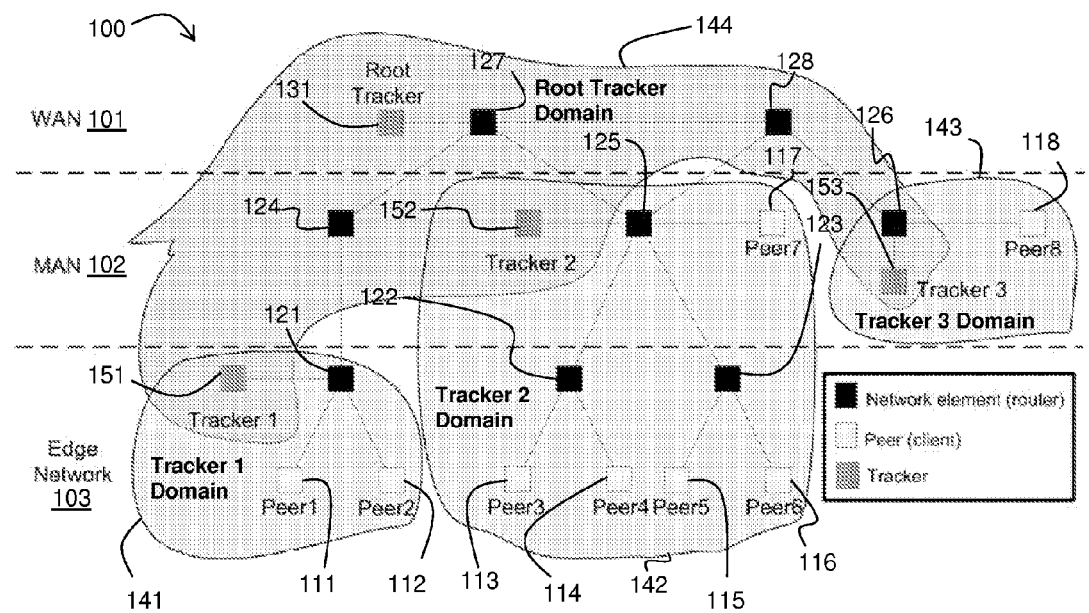
FIG. 2 is a schematic illustration of the network of FIG. 1 showing tracker domains.

The higher level is formed by the root tracker 131, which concentrates the information about all the content available on all of the operators' trackers and knows all trackers in the operator domain. FIG. 2 illustrates the relationship between the high level root tracker 131 and lower level "local" trackers 151-153. A root tracker domain 144 is formed by all the operators' trackers 131, 151, 152, 153 and network elements 121-124, 126-128. Each tracker 151-153 reports to the root tracker 131 which content (and which parts of that content) are available in their domain in order to make it possible to identify all available content (delivered by P2P) under the operator domain. The root tracker only deals with the other trackers 151-153, and does not receive requests directly from the peers 111-118.

Similarly, when there are many levels, the domain of any particular tracker will contain the trackers below it in the hierarchical tree.

As discussed above, each tracker 151-153 contains more information than simply the peers having the requested content. Each tracker also contains details of the network topology and conditions of its respective domain. The network topology is known by the operator, and the topology of the relevant portion of each network may therefore be passed to each tracker by the network operator. Current conditions may be determined by each tracker 151-153 for their domain, for example using Simple Network Management Protocol (SNMP) probes.

In order to use the operator network topology and link load information, each tracker 131, 151, 152, 153 (including the root tracker 131) operates one weighted graph with the network topology of its domain, in which:
Edges are the network links;
Nodes are peers and network elements; and
Weights of the edges are computed by previously defined criteria. The weight of the edges may, be calculated depending on the current load conditions in the link plus operator policies.

In the weighted graph, the distance between two peers indicates the cost for that connection. Therefore, if a requesting peer can download the desired content from several other peers, the one with the lowest cost represents the best option for acquiring the content. Consequently, the criteria adopted to compute the edge weight and the algorithm for determining the shortest path will define the quality of the peer selection, impacting on the usage of the network resources.

Figure 3:
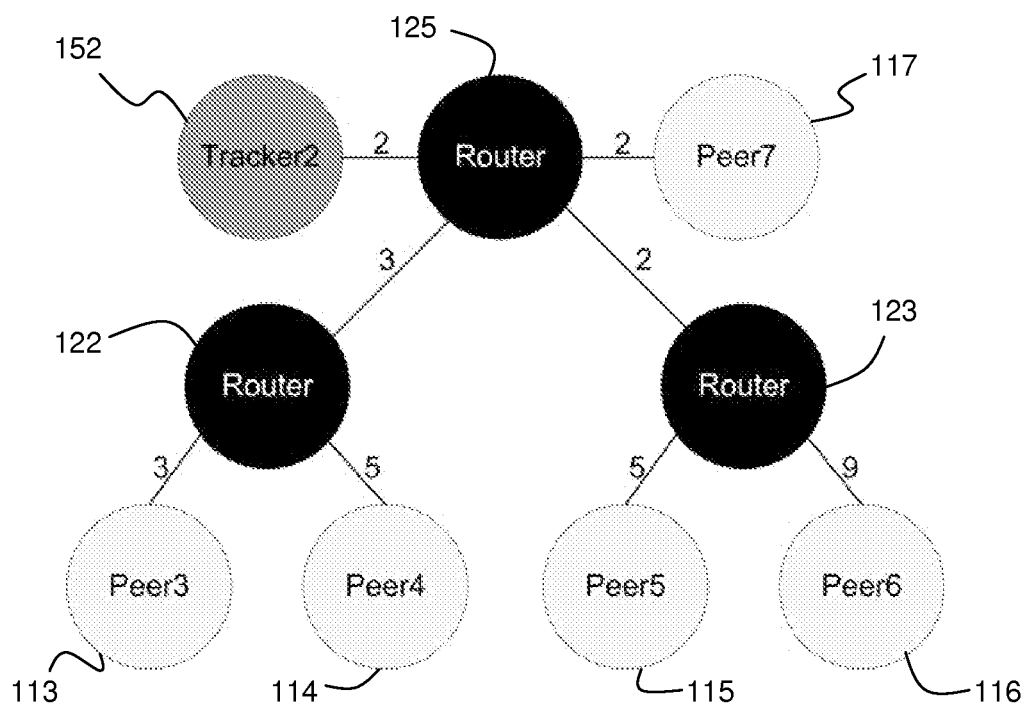
FIG. 3 is a weighted graph illustrating the network cost of communication between nodes in one tracker domain.

This can be understood by reference to FIG. 3, which illustrates a simple weighted graph for tracker2 152 shown in FIG. 1. The nodes (peers 113-117 and routers 122, 123) are labelled in the same way as in FIG. 1. Each link between network nodes is assigned a weight (or cost) illustrated by a number in FIG. 3. For example, the link between Peer5 115 and its associated router 123 has a cost of 5. The minimum link cost between Peer5 115 and Peer3 113 is 5+2+3+3=13, whereas the minimum link cost between Peer5 115 and Peer6 116 is 5+9=14.

The link costs should be calculated using up to date information available to the tracker. Information that can be used by the tracker includes, but it is not limited to: total and used link bandwidth, latency, type of link (copper, fibre), business rules, amongst others.

Figure 4:
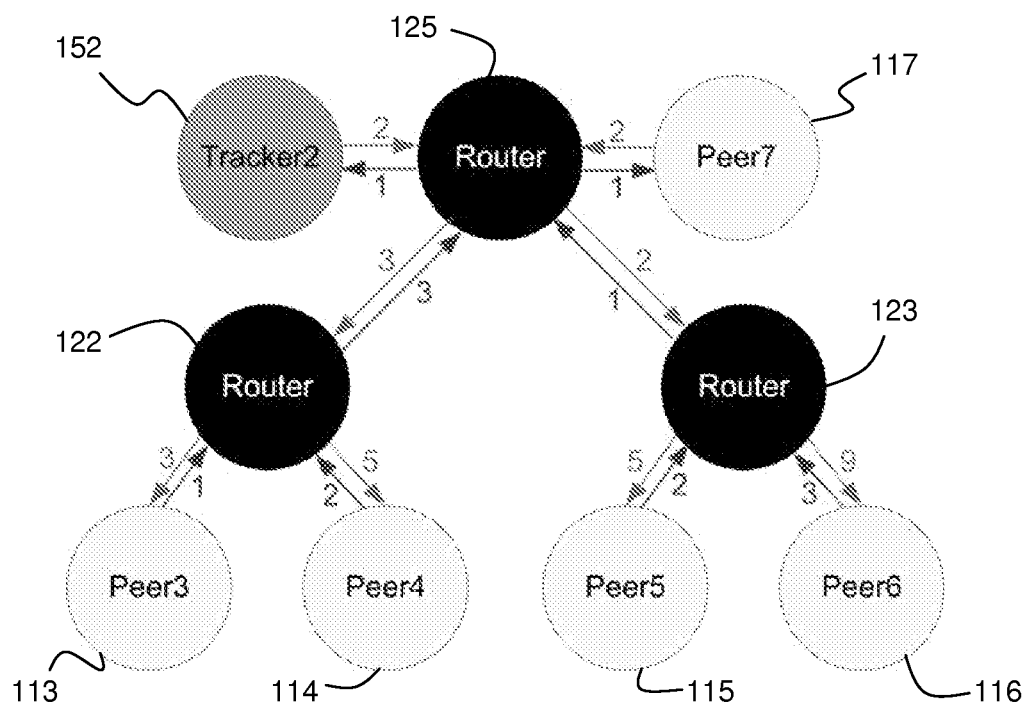
FIG. 4 is a weighted graph illustrating uplink and downlink costs between nodes in the domain of FIG. 3.

Network links can be asymmetric, as a result of different bandwidth rates for upstream and downstream data transfer. In order to model this type of network, directed graphs may be used to allow the configuration of asymmetric links. This characteristic results on two weights to each graph edge. An example of such a graph is shown in FIG. 4.

It will be appreciated that some peers may perform different functions, either within individual domains or the whole network. For example, Peer7 117 could be provided to act as a "cache" peer rather than a "client" peer. In other words, Peer7 may not be used by a user to view content, but may be maintained by the operator simply to store content. If any of the other peers 113-116 in the same domain 142 as Peer7 117 request content, blocks of that content may be copied automatically to Peer7 117.

Figure 5:
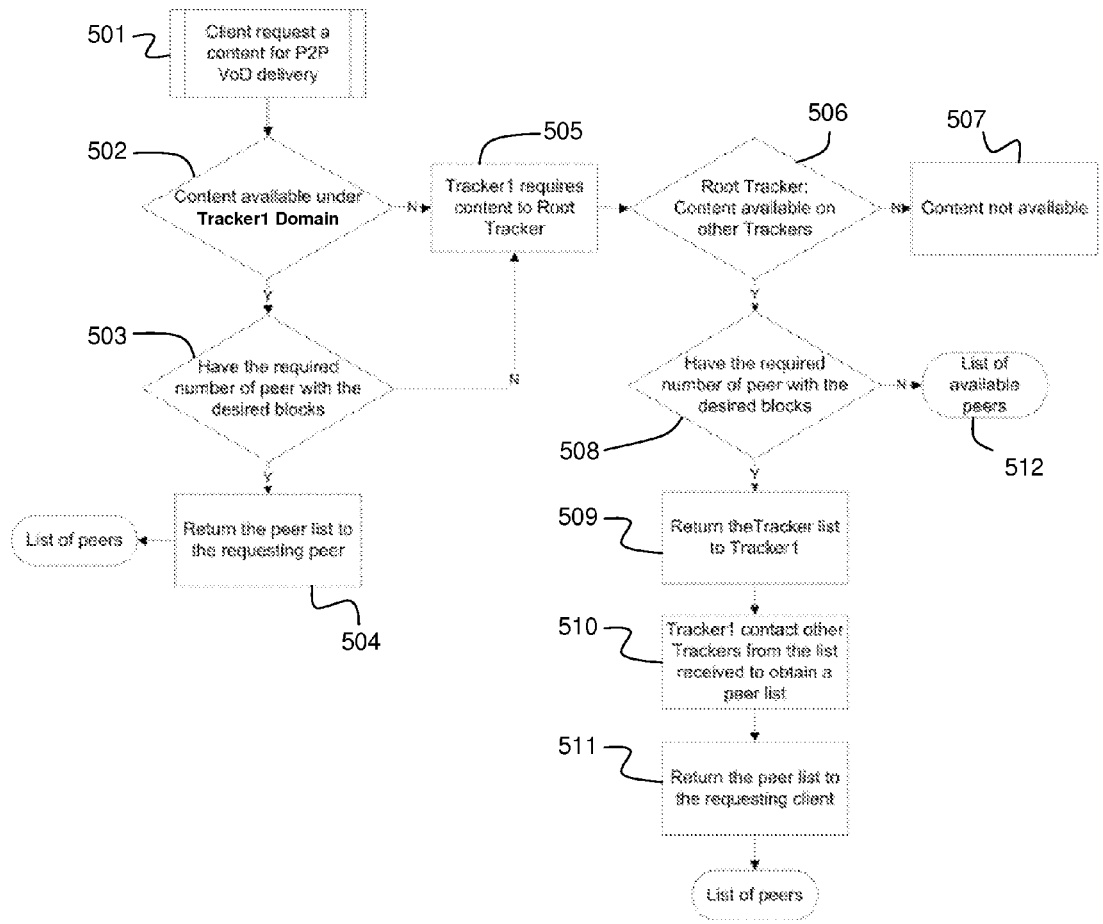
FIG. 5 is a flow chart illustrating the actions taken by a local tracker, and trackers higher up the hierarchy, in response to a content data request from a peer.

FIG. 5 illustrates how a tracker (e.g. Tracker1 151) deals with client requests and how locality is achieved in the network. Since each tracker is responsible for peers (or hierarchically lower trackers) in a very well defined domain, the hierarchy will provide inherent locality. If there are available peers in the local tracker domain those will always be preferred.

As shown in FIG. 5, when a peer (e.g. Peer1 111) makes a request to its local tracker (Tracker1 151) for content 501, the tracker 151 first determines 502 whether or not that content that is unavailable in its domain 141. If the content is available within that domain 141 (e.g. at Peer2 112), the tracker checks 503 that the required number of peers with the necessary blocks are available in the domain 141. If so, then the peer list with the required blocks is returned 504 to the peer 111. If the content is not available in the local domain or some blocks are missing, the tracker 151 contacts 505 the root tracker 131 (or tracker next up in the hierarchy if there are more than two levels) in order to obtain a list of other trackers that have the requested content in their domains.

The root tracker 131 verifies 506 its table to identify the trackers that have the requested content in their domains. If there are no other domains in which the requested content is present, a message is returned 507 to the original tracker 151 indicating this. If more than one tracker has the content in its domain, the root tracker 131 uses its graph to select the most appropriate tracker(s). If these trackers have peers with the necessary blocks 508, then a list of these trackers is returned 509 to the original tracker 151 which has the requesting peer 111 in its domain. The original tracker 151 communicates 510 with these other trackers, (which have the content in their domains) in order to obtain a list of peers to add temporarily to its swarm/scope. This peer list is then sent 511 to the requesting peer 111. When a peer in the domain 141 of the requesting peer 111 has acquired the content, the external peers are removed from the swarm/scope by the original tracker 151. Alternatively, the temporary list of peers may be maintained by the original tracker 151 for a predetermined period of time (e.g. a few minutes) as a list of sources for the requested content. These entries need to be marked in some way in the content table so show that they are external. If another peer node (e.g. Peer2 112) in the original tracker domain 141 requests the same content, the original tracker1 151 will already know where this content can be found. If no peer requests that content in the predetermined time period then the entry expires.

If the trackers which have the content in their domain do not, collectively, have the required number of peers with the desired blocks, then a list of those peers 512 which do have some of the content is returned to the original tracker 151 and thence to the requesting peer 111.

The process described above requires each tracker to know what content is present in its domain, and also requires trackers higher up the hierarchy to be able to identify what content is present in all the domains lower down the hierarchy. The tracker graphs (of the type shown in FIGS. 3 and 4) are used to compute the best route between the origin (requesting the content) and destination (having the content) peer. However, Content can be divided into blocks, or chunks, and it will be appreciated that among all the peers available, only a subset have each requested content chunk. Thus, it is necessary to identify those in order to provide adequate information to apply the shortest path algorithm to the required peer. The original tracker 151 verifies if the content is available by performing the following steps (shown in FIG. 5):

The tracker 151 uses a local content table to identify if there are peers with the requested content. The tracker 151 will only return 503 a list of peers if there are enough peers in the Tracker1 domain 141 that, when grouped, can satisfy the client request;

If the resources available inside the tracker domain 141 are not enough to satisfy the peer's request, the tracker module tries 506 to locate the content inside other tracker domains by communicating with the root tracker.

Both steps require the tracker 151 or root tracker 131 to verify the content availability in their domain. The tracker 151 does the verification by consulting a Content ID+content blocks on a content table maintained by it.

The tracker content table is maintained by the tracker and updated according to the information provided by peers in its domain. It will be appreciated that this requires a modification of the BitTorrent protocol. The fields defined in the tracker content table are:

Content ID: obtained by the client (peer) from the EPG (Electronic Programming Guide) or other configuration means;

Client ID: the universal identification of the client (peer); and

Content blocks: a bit field containing all available blocks in the peer.

The inclusion of an entry on the table happens when a peer joins a swarm on the tracker. Thereafter, the registry information is updated based on the information provided by the client using messages of keep alive or update chunk list. A registry line is deleted due to the active disconnection of the client from the swarm or a connection time-out.

This can be understood by considering exemplary content tables of the three local trackers 151, 152, 153 shown in FIG. 2. Suppose, for example, that Peer1 111 has some content blocks from content with Content ID 100001, and some blocks with content from Content ID 100002. Peer2 112 has a different set of blocks of the content with Content ID 100001. The content table maintained by Tracker1 151 (of the content in its domain 141) is as follows:

| Content ID | Client ID | Content Blocks |
| --- | --- | --- |
| 100001 | Peer1 | 0000111000 |
| 100001 | Peer2 | 1100011111 |
| 100002 | Peer1 | 1111100000 |

A similar exemplary content table for Tracker2 152 may be as follows:

| Content ID | Client ID | Content Blocks |
| --- | --- | --- |
| 100001 | Peer3 | 0000111100 |
| 100001 | Peer5 | 1111000000 |
| 100002 | Peer4 | 1111100000 |
| 100003 | Peer6 | 0001111000 |

A similar exemplary content table for Tracker3 153 may be as follows:

| Content ID | Client ID | Content Blocks |
| --- | --- | --- |
| 100001 | Peer8 | 1111111111 |
| 100002 | Peer8 | 1111111111 |
| 100003 | Peer8 | 1111111111 |

Unlike the original implementation of the BitTorrent protocol, the Content ID field indexes these tables, and the content blocks indicate which blocks are possessed by each peer.

A root tracker content table is maintained by the root tracker 131 and updated according to the information provided by the lower level trackers available in its domain. The root tracker content table includes the following fields:
Tracker ID: a unique tracker identification in the operator domain;
Content ID: the same ID used by the client; and
Content blocks: a bit field containing all available blocks in the lower level tracker domain.

When a tracker starts to manage a new content, a new entry must be inserted on the root tracker content table. Furthermore, the update of an entry on the tracker content table must produce an update on the root tracker content table. As soon as a peer finishes downloading a new block, the tracker updates its table entry corresponding to that content. If the downloaded block is new in that domain, the tracker triggers the update of the root tracker table. A root tracker registry will only be deleted when the content is no longer available in any of the trackers within the root tracker domain. In order to implement this, each tracker sends a compilation of the content available in its domain to the root tracker according to insertion, modification or deletion of registries. This compilation is made by applying a logical OR operation on the Content Blocks field of the registries with the same Content ID. The root tracker has no information about the peers themselves, as they are not necessary for the functioning of the locality service at root tracker level.

Returning to the example above, the root tracker 131 content table is populated from the content tables of Tracker1 151, Tracker2 152 and Tracker3 153, and is as follows:

| Content ID | Tracker ID | Content Blocks |
| --- | --- | --- |
| 100001 | Tracker1 | 1100111111 |
| 100001 | Tracker2 | 1111111100 |
| 100001 | Tracker3 | 1111111111 |
| 100002 | Tracker1 | 1111100000 |
| 100002 | Tracker2 | 1111100000 |
| 100002 | Tracker3 | 1111111111 |
| 100003 | Tracker2 | 0001111000 |
| 100003 | Tracker3 | 1111111111 |

The root tracker thus concentrates information about the content available in all trackers in the operator domain. The Content ID also indexes this information on the root tracker. Data aggregation is achieved since trackers up in the hierarchy only know that a given content chunk/block is available in a given domain. Trackers further up in the hierarchy do not know which peers actually possess that block.

The use of the tracker and root tracker content tables allows the identification of the content distribution in the entire operator domain, and also the location of all peers and trackers. Therefore, when a peer requests a content block, the tracker can find all peers that seed the desired content, whether they are in its domain or in other trackers' domains. However, it does not define which of them will be on the peer list returned to the requesting peer. This definition will be made based on the lowest cost results provided by the selected algorithm applied to the defined graphs shown in FIGS. 3 and 4. One example of such an algorithm is the shortest path algorithm.

Figure 6:
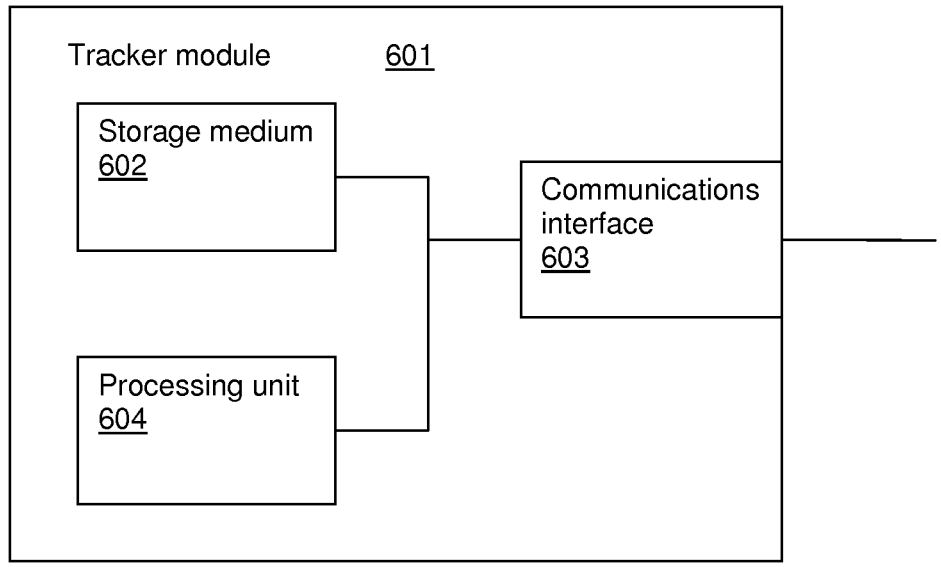
FIG. 6 is a schematic illustration of a tracker module.

FIG. 6 is a schematic illustration of a tracker module 601. The tracker module 601 could be a root tracker 131, or tracker 151, 152, 153 further down the hierarchy as shown in FIGS. 1 and 2. The tracker module 601 includes a storage medium 602 for storing a content table thereon. A communications interface 603 is configured to communicate with other network elements, and in particular to receive and respond to content data requests from peers in the domain controlled by the tracker module, and to send content data requests further up the tracker hierarchy if required. A processing unit 604 is configured to identify whether or not the requested data is available in peers in the tracker's own domain, and to manage the data transfer within the domain. It will be appreciated that the functions of the tracker module 601 may be carried out as a result of the use of software or hardware or a combination of the two.

Figure 7:
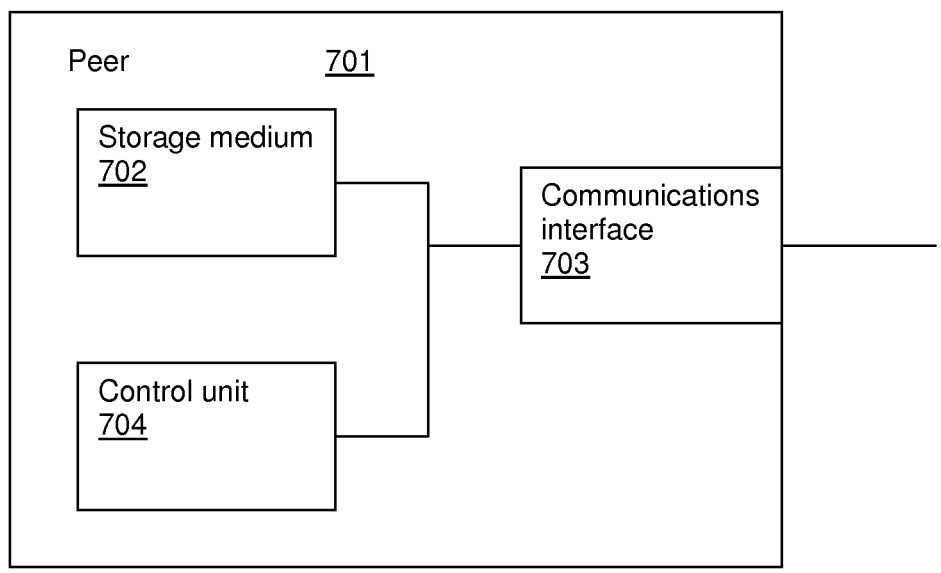
FIG. 7 is a schematic illustration of a network element configured to operate as a peer in a P2P network.

FIG. 7 is a schematic illustration of a network element 701 configured to operate as a peer (or client). The network element could be any of the peers 111-118 shown in FIGS. 1 and 2. The network element 701 includes a storage medium 702 for storing content data in the form of content blocks. A communications interface 703 communicates with other network elements, and in particular receives content blocks from other peers in the network, and sends content blocks to other peers. In addition, the communications interface notifies the tracker module of the tracker domain in which the network element is located of which content blocks are contained in the storage medium and which are therefore available for forwarding to other peers. When the peer wishes to receive content data, a request for that content is sent from the communications interface 703 to the local tracker module. A control unit 704 controls the operation of the storage medium 702 and communications interface 703. It will be appreciated that the functions of the network element 701 may be carried out as a result of the use of software or hardware or a combination of the two.

The tracker model described above allows operators to utilize P2P technology in a cost efficient way without compromising on service quality. The operator that utilizes the proposed model will be able to optimize network resources usage in order to reduce the costs of content distribution by utilizing better selection criteria of the network areas in which the peers will obtain the content.

The well known problem of locality awareness in P2P systems is solved since trackers only contain information about local seeding peers. The arrangement described above also provides an efficient and simple solution to the scalability issue.

The invention claimed is:

1. A tracker module for use in a peer-to-peer communications network, the tracker module configured to manage content data transfers between a discrete set of network elements forming a tracker domain within the network, the tracker module comprising:
   a storage medium having a content table stored therein, the content table including a record of content data available to each network element within the tracker domain;
   a communications interface for receiving a content data request from a requesting network element in the tracker domain;
   a processing unit for interrogating the content table stored in the storage medium and determining whether the requested content data is available to any of the network elements within the tracker domain;
   wherein the tracker module is configured so that:
      if the requested content data is available to any of the network elements within the tracker domain, the processing unit determines a list of network elements through which the content data is available, and the communications interface sends said list to the requesting network element; and
      if the requested content data is not available to any of the network elements within the tracker domain of the tracker module, the communications interface of the tracker module sends a supplementary request for the content data to another tracker module in the network, the other tracker module being higher up in a tracker hierarchy in the network; and
   wherein the tracker module is a first tracker module in a lower hierarchy level, wherein the other tracker module is in a higher hierarchy level, and wherein the tracker module is configured to receive, from the other tracker module, information identifying an additional tracker module in the lower hierarchy level which has the requested content data available to network elements within a tracker domain of the additional tracker module.

2. The tracker module of claim 1, wherein the content data is subdivided into blocks, and wherein the content table includes a record of which blocks are available to each network element in the tracker domain.

3. The tracker module of claim 2, wherein the requesting network element is an end user peer in the tracker domain, and wherein the content table includes a record of the content blocks stored by other peers in the tracker domain.

4. The tracker module of claim 1, wherein the requesting network element is another tracker module in the tracker domain which is lower in the tracker hierarchy, and wherein the content table includes a record of content data available to other tracker modules in the tracker domain.

5. The tracker module of claim 4, wherein the record of content data available to each other tracker module in the tracker domain does not include a record of the peer on which the content data is stored.

6. The tracker module of claim 1, wherein the communications interface is configured to receive content data updates from network elements within the tracker domain, the content data updates informing the tracker module of changes to the content data available to the respective network elements, and wherein the processing unit is configured to update the content table to reflect the content data updates.

7. The tracker module of claim 1, further configured so that, if a supplementary request for the content data is sent to the other tracker module higher up in the tracker hierarchy, the communications interface is configured to receive a content data location response from the other tracker module, the content data location response providing a list of tracker modules in the network through which the requested content data is available.

8. The tracker module of claim 7, wherein the communications interface is configured to contact the other tracker modules in the network to obtain a list of peers in the network from which the requested content data can be obtained.

9. The tracker module of claim 8, wherein the list of peers identifies the peers at which specific blocks of the content data can be obtained.

10. The tracker module of claim 8, further configured to hold the list of peers in the storage medium for a finite period of time so that the list is available to other network elements in the tracker domain.

11. The tracker module of claim 1, wherein the storage medium has stored therein a record of the network topology of the tracker domain, and wherein the processing unit is configured to take the network topology into account when determining the list of network elements through which the content data is available so as to optimize use of network resources.

12. The tracker module of claim 11, wherein the network topology is received from a network operator.

13. The tracker module of claim 1, wherein the communications interface is configured to receive a notification of current network conditions within the tracker domain, and wherein the processing unit is configured to take the current network conditions into account when determining the list of network elements through which the content data is available so as to optimize use of network resources.

14. A computer program, comprising computer readable code which, when run by a tracker module, causes the tracker module to operate as a tracker module according to claim 1.

15. The tracker module of claim 1, wherein the tracker module is configured to report, to the other tracker module, what content are available in the tracker module's tracker domain.

16. A system for managing content data transfers in a peer-to-peer communications network, the system comprising:
   a hierarchical arrangement of tracker modules, each tracker module being responsible for managing a tracker domain of network elements;
   wherein each tracker module has stored therein a content table including a record of content data available to the network elements within its respective tracker domain;
   and wherein each tracker module responsible for a tracker domain containing end user peers is configured so that, if a content data request is received by the tracker module from a requesting peer in its respective tracker domain:

if the requested content is held by enough other peers in that tracker domain of the tracker module to supply the content data, a list of peers having the content data stored thereon is sent by the tracker module to the requesting peer; and if the requested content is not held by enough other peers in that tracker domain of the tracker module, the content data request is transferred by the tracker module to a next tracker module up in the hierarchy; and wherein the tracker module is a first tracker module in a lower hierarchy level, wherein the other tracker module is in a higher hierarchy level, and wherein the tracker module is configured to receive, from the other tracker module, information identifying an additional tracker module in the lower hierarchy level which has the requested content data available to network elements within a tracker domain of the additional tracker module.

17. The system of claim 16, configured so that the content data request is passed up the tracker module hierarchy until a tracker module is reached in which the content table includes a record of the requested content data.

18. The system of claim 16, wherein:
the content data is separated into blocks;
the content table of each tracker module having end user peers in its respective tracker domain identifies the blocks stored by each end user peer in that tracker domain; and
the content table of each tracker module having hierarchically lower tracker modules in its respective tracker domain identifies the blocks stored within the tracker domain of each hierarchically lower tracker module.

19. The system of claim 16, wherein each tracker module includes a record of network topology and current network conditions in its respective tracker domain, and the list of peers is calculated on the basis of the network topology and current network conditions so as to optimize network resources.

20. The system of claim 19, wherein the record of network topology includes a weighted graph with transmission costs for each link.

21. The system of claim 16, wherein the list of peers contains the minimum number of peers possible to provide the content data.

22. The system of claim 16, wherein each tracker module comprises:
a storage medium having a content table stored therein, the content table including a record of content data available to each network element within the tracker domain;
a communications interface for receiving a content data request from a requesting network element in the tracker domain;
a processing unit for interrogating the content table stored in the storage medium and determining whether the requested content data is available to any of the network elements within the tracker domain;
wherein the tracker module is configured so that:
if the requested content data is available to any of the network elements within the tracker domain, the processing unit determines a list of network elements through which the content data is available, and the communications interface sends said list to the requesting network element; and
if the requested content data is not available to any of the network elements within the tracker domain, the communications interface sends a supplementary request for the content data to another tracker module in the network, the other tracker module being higher up in a tracker hierarchy in the network.

23. The system of claim 16, wherein one of the network elements is configured to operate as a peer in a tracker domain managed by the tracker module in the peer-to-peer communications network, the network element comprising:
a storage medium for storing content data in the form of content blocks;
a communications interface for:
receiving content blocks from other peers in the network;
forwarding content blocks to other peers in the network; and
notifying the tracker module of the content blocks stored in the storage medium and available for forwarding to other peers; and
a control unit for controlling the storage medium and communications interface and identifying the tracker module in the tracker domain.

24. The system of claim 23, wherein the communications interface of the network element is configured to send a request for content data to the tracker module in the tracker domain.

25. A method of managing content data transfers in a peer-to-peer communications network partitioned into tracker domains, each managed by a respective tracker module, the tracker modules being organised in a hierarchical structure, the method comprising:
maintaining a content table at each tracker module, the content table including a record of content data available to network elements within its respective tracker domain;
sending a content data request from a peer on one of the tracker domains to the tracker module responsible for that domain;
if the content table maintained by that tracker module indicates that the content data is held by enough other peers within the domain to supply the data, sending a list of peers holding the content data from the tracker module to the requesting peer, and downloading the content to the requesting peer from the peers on the list; and
if the content table indicates that the content data is not held by enough other peers within the domain:
the tracker module for that domain forwarding the content data request to one or more tracker modules further up the hierarchy until one is reached whose content table indicates that the content data is available to one or more network elements within its tracker domain;
establishing contact between the tracker module for that domain, at which the original request was received, and the tracker module that is reached with access to the contact data;
forwarding a list of peers having the content to the requesting peer; and
downloading the content to the requesting peer; and
wherein the tracker module for that domain is in a lower hierarch level, and wherein the one or more tracker modules further up the hierarchy has information on all content available to tracker domains of all tracker modules in the lower hierarchy level.

26. The method of claim 25, wherein the information contained in the content tables of tracker modules is aggregated up the hierarchy, so that:

tracker modules which are contacted directly by peers have a record of content data blocks stored by those peers; and tracker modules which are contacted by hierarchically lower tracker modules have a record of content data blocks stored under those hierarchically lower tracker modules, without having a record of the peers at which those content data blocks are stored.

27. The method of claim 25, wherein each tracker module has a record of network topology and network conditions within its tracker domain, and configures the list of peers to send to the requesting peer taking these into account.

28. The method of claim 25, wherein each tracker module comprises:
a storage medium having a content table stored therein, the content table including a record of content data available to each network element within the tracker domain;
a communications interface for receiving a content data request from a requesting network element in the tracker domain;
a processing unit for interrogating the content table stored in the storage medium and determining whether the requested content data is available to any of the network elements within the tracker domain;
wherein the tracker module is configured so that:
if the requested content data is available to any of the network elements within the tracker domain, the processing unit determines a list of network elements through which the content data is available, and the communications interface sends said list to the requesting network element; and
if the requested content data is not available to any of the network elements within the tracker domain, the communications interface sends a supplementary request for the content data to another tracker module in the network, the other tracker module being higher up in a tracker hierarchy in the network.

29. A computer program, comprising computer readable code which, when run by a tracker module, causes the tracker module to operate the method of claim 28.

30. A computer program product comprising a computer readable medium and a computer program according to claim 29, wherein the computer program is stored on the computer readable medium.

31. The method of claim 25, wherein the one or more tracker modules further up the hierarchy do not directly receive any content data request from any peer in the tracker module's tracker domain.

32. A method of managing data in a peer-to-peer communications network, comprising:
at a tracker module responsible for managing content data transfers between a discrete set of network elements forming a tracker domain within the network, receiving a content data request from a requesting network element within the tracker domain;
interrogating a content table stored at the tracker module, the content table including a record of content data available to each network element within the tracker domain;
determining whether the requested content data is available to enough network elements within the tracker domain to supply the content data;
if the requested content data is available to enough network elements within the tracker domain, determining a list of network elements through which the content data is available, and sending said list to the requesting network element; and
if the requested content data is not available to enough network elements within the tracker domain of the tracker module, the tracker module sending a supplementary request for the content data to another tracker module in the network, the other tracker module being higher up in a tracker hierarchy in the network; and
wherein the tracker module for that domain is in a lower hierarchy level, and wherein the one or more tracker modules further up the hierarchy has information on all content available to tracker domains of all tracker modules in the lower hierarchy level.

33. The method of claim 32, wherein the tracker module comprises:
a storage medium having a content table stored therein, the content table including a record of content data available to each network element within the tracker domain;
a communications interface for receiving a content data request from a requesting network element in the tracker domain;
a processing unit for interrogating the content table stored in the storage medium and determining whether the requested content data is available to any of the network elements within the tracker domain;
wherein the tracker module is configured so that:
if the requested content data is available to any of the network elements within the tracker domain, the processing unit determines a list of network elements through which the content data is available, and the communications interface sends said list to the requesting network element; and
if the requested content data is not available to any of the network elements within the tracker domain, the communications interface sends a supplementary request for the content data to another tracker module in the network, the other tracker module being higher up in a tracker hierarchy in the network;
wherein the content data is subdivided into blocks, and wherein the content table includes a record of which blocks are available to each network element in the tracker domain.

* * * * *